United States Patent
Collins

(10) Patent No.: US 11,174,728 B2
(45) Date of Patent: Nov. 16, 2021

(54) ESTIMATION OF FORMATION ELASTIC CONSTANTS FROM DRILLING

(71) Applicant: HALLIBURTON ENERGY SERVICES, INC., Houston, TX (US)

(72) Inventor: Mark Vincent Collins, Spring, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 94 days.

(21) Appl. No.: 16/590,166

(22) Filed: Oct. 1, 2019

(65) Prior Publication Data

US 2020/0392841 A1 Dec. 17, 2020

Related U.S. Application Data

(60) Provisional application No. 62/861,720, filed on Jun. 14, 2019.

(51) Int. Cl.
| | | |
|---|---|---|
| E21B 49/00 | (2006.01) | |
| G06N 3/04 | (2006.01) | |
| E21B 45/00 | (2006.01) | |
| G01V 9/00 | (2006.01) | |
| G06N 3/08 | (2006.01) | |

(52) U.S. Cl.
CPC ............ *E21B 49/003* (2013.01); *E21B 45/00* (2013.01); *E21B 49/00* (2013.01); *G01V 9/00* (2013.01); *G06N 3/04* (2013.01); *G06N 3/08* (2013.01)

(58) Field of Classification Search
USPC .......................................................... 702/9
See application file for complete search history.

(56) References Cited

U.S. PATENT DOCUMENTS

| | | | |
|---|---|---|---|
| 7,404,456 B2 | 7/2008 | Weaver et al. | |
| 8,098,543 B2 | 1/2012 | Bachrach et al. | |
| 9,664,039 B2 | 5/2017 | Neale et al. | |
| 10,132,162 B2 | 11/2018 | Neale et al. | |
| 2003/0125878 A1 | 7/2003 | Bakulin et al. | |
| 2003/0216894 A1* | 11/2003 | Ghaboussi | G01L 5/0004 703/2 |
| 2008/0165619 A1* | 7/2008 | Bachrach | G01V 1/30 367/38 |
| 2009/0070042 A1* | 3/2009 | Birchwood | G01V 1/50 702/11 |

(Continued)

OTHER PUBLICATIONS

Adam Haecker, James Lakings, Eric Marshall, Josh Ulla; A Novel Technique for Measuring (Not Calculating) Young's Modulus, Poisson's Ratio and Fractures Downhole: A Bakken Case Study, SPWLA 58th Annual Logging Symposium, Oklahoma City, Oklahoma, Jun. 17-21, 2017.

(Continued)

*Primary Examiner* — Paul D Lee
(74) *Attorney, Agent, or Firm* — Polsinelli PC

(57) ABSTRACT

Systems and methods are provided for identifying one or more properties of a rock formation. A system may be configured to receive sensor data obtained from one or more sensors, the sensor data generated from drilling operations performed in a wellbore, generate stress metrics and strain metrics for the sensor data based on a calibrated stress and strain map, and identify one or more properties of a rock formation based on the stress metrics and the strain metrics.

5 Claims, 9 Drawing Sheets

(56) References Cited

U.S. PATENT DOCUMENTS

| | | | |
|---|---|---|---|
| 2009/0210160 A1 | 8/2009 | Suarez-Rivera et al. | |
| 2016/0069182 A1 | 3/2016 | Neale et al. | |
| 2016/0290113 A1* | 10/2016 | Kisra | G01V 1/50 |
| 2016/0290130 A1 | 10/2016 | Neale et al. | |
| 2016/0291181 A1 | 10/2016 | Sinha | |
| 2017/0058669 A1 | 3/2017 | Lakings et al. | |
| 2017/0067337 A1 | 3/2017 | Havens et al. | |
| 2017/0115420 A1* | 4/2017 | Cazeneuve | G01V 1/284 |
| 2017/0115422 A1* | 4/2017 | Kitazawa | G01V 1/303 |
| 2017/0235016 A1* | 8/2017 | Prioul | G01V 99/005 73/152.01 |
| 2017/0275989 A1 | 9/2017 | Lakings et al. | |
| 2018/0106147 A1 | 4/2018 | Lakings et al. | |
| 2018/0371901 A1 | 12/2018 | Lakings et al. | |
| 2020/0096659 A1* | 3/2020 | Eftekhari Far | E21B 47/14 |
| 2020/0256187 A1* | 8/2020 | Lakings | E21B 49/006 |

OTHER PUBLICATIONS

Kumar, B. R., Vardhan, H., and M. Govindaraj, 2011. Prediction of Uniaxial Compressive Strength, Tensile Strength and Porosity of Sedimentary Rocks Using Level Produced During Rotary Drilling, Rock Mechanics and Rock Engineering, Sep. 2011, vol. 44, Issue 5, pp. 613-620.

Mark Collins, Joint VTI and Mud Slowness Inversion Using Multiple Modes and Adaptive Weighting, URTeC Control ID No. 1562145, Unconventional Resources Technology Conference, Denver, Colorado, Aug. 12-14, 2013.

Mark Collins, Methodology for Analytic Estimation of Fast Shear Polarization Direction in HTI Formations, SPE 161085, SPE Eastern Regional Meeting, Lexington, Kentucky, Oct. 3-5, 2012.

International Search Report and Written Opinion for International application No. PCT/US2020/033242, dated Sep. 1, 2020, 9 pages.

* cited by examiner

ESTIMATION OF FORMATION ELASTIC CONSTANTS FROM DRILLING

CROSS-REFERENCE TO RELATED APPLICATIONS

This application claims the benefit of, and priority to, U.S. Provisional Patent Application No. 62/861,720 filed on Jun. 14, 2019, entitled "ESTIMATION OF FORMATION ELASTIC CONSTANTS FROM DRILLING DATA," the contents of which are hereby expressly incorporated by reference in their entirety.

TECHNICAL FIELD

The present disclosure is related generally to identifying rock properties, and more particularly to identifying rock properties for drilling.

BACKGROUND

During drilling operations, operators employ any number of methods and devices to ascertain information about downhole conditions. For example, information about a formation's lithology and the type of formation fluid can be determined using wireline logging or measurement-while-drilling (MWD) techniques. In developed reservoirs, similar information can be inferred from logs of offset wells, geological maps, and the like. Cuttings circulated to the surface may also be used to identify a formation's lithology, and changes in mud weight or resistivity (in water based muds) can be used to indicate the presence of hydrocarbons. Numerous other techniques and tools may also be used to gather information about downhole conditions.

Most of the methods mentioned above, however, do not provide real-time information during drilling operations. Wireline logging can be conducted only after the formation of interest has already been drilled through. Offset logs offer only general guidance, since there is no guarantee that the location, porosity, thickness, etc. of a formation of interest will be the same between offset wells and a well being drilled. Cuttings and changes in mud characteristics are known only after mud that is at the bit has had time to circulate to the surface. Some MWD tools require drilling to be suspended while a wireline or slickline is dropped through the drill string to retrieve data recorded by the downhole tool.

Acoustic-type MWD tools may provide information about formation properties in real-time. Acoustic-type tools generally measure various properties of acoustic signals (e.g. the time it takes an acoustic signal to travel from a transmitter, through the formation, and back to a receiver) to determine properties of the rock surrounding the wellbore. Such tools may be hindered by, for example, the acoustic signal being required to pass through multiple formation types having different acoustic properties, variations in mud density, noise generated by the drill string, or the like.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
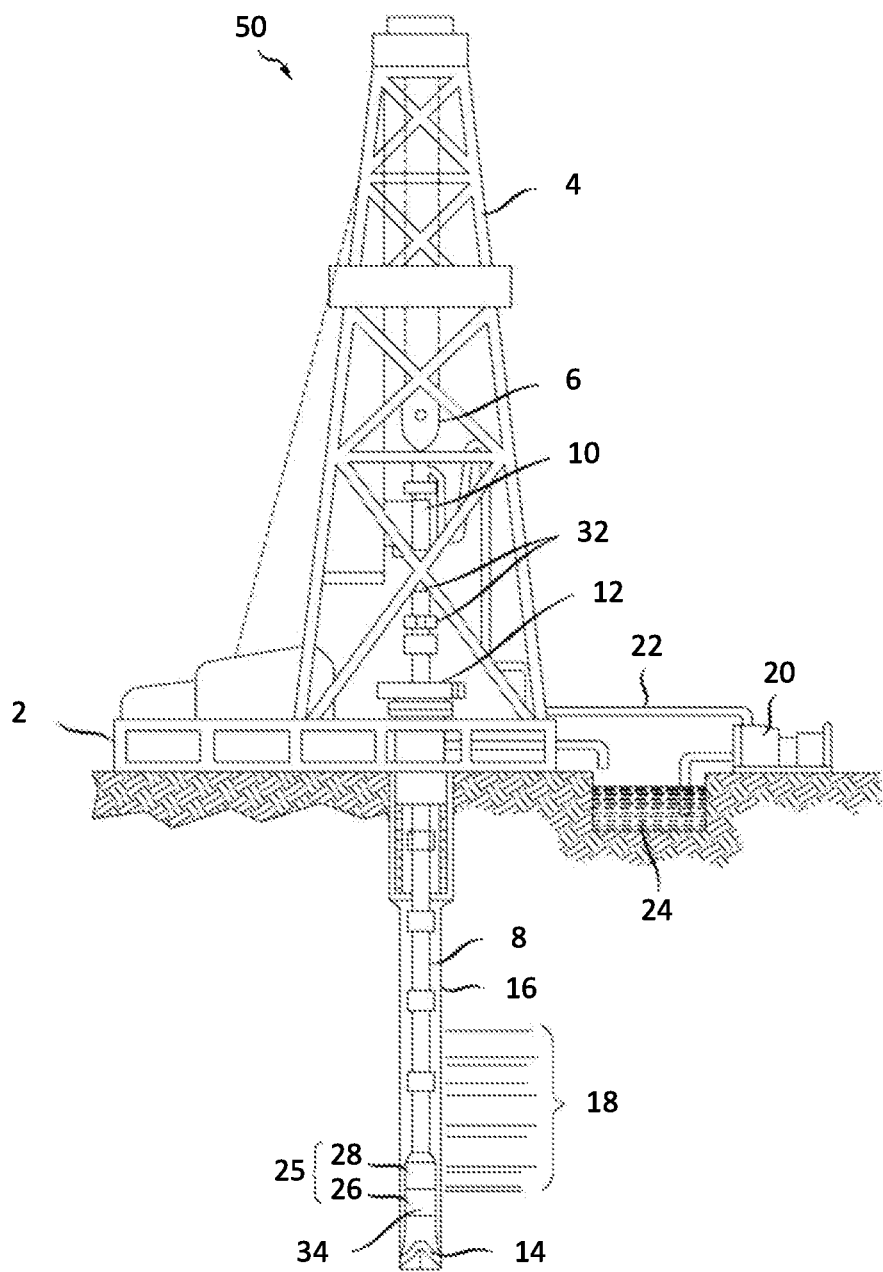
FIG. 1A is a schematic diagram of an example Logging While Drilling wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Aspects of the subject technology relate to improved systems and methods for estimating acoustic elastic constants from drilling data in real-time (while drilling) or near real-time based on calibration from an offset well, a library, or a depth interval of the currently drilled well. According to some embodiments, borehole drilling sensors record data such as depth, time, acceleration, rate of penetration (ROP), weight on bit (WOB), torque on bit (TOB), magnetometer and gyroscope data, and the like. Other sensors may also be on the drill string providing acoustic data, density measurements, gamma ray measurements, and the like. A computing system may be configured to collect the data from the various sources and relate the statistical properties of the recorded data to the acoustic properties of the rocks in the formation. The system may further calibrate a linear mapping of sensor data to stress and strain using independently obtained elastic constant data. The independent data may come from various sources such as wireline or logging while drilling (LWD acoustic and density data, laboratory measurements based on core cuttings, or from a library developed over time from prior calibrations for different types of drill bit.

According to various embodiments, the calibration performed by the system not only estimates the parameters of the linear map, but also optimizes the structure of the linear map. Once an optimal mapping is determined with regards to type of stress and/or strain excitation, number of drilling parameters used in the inversion, and number of estimated acoustic elastic constants, multiple linear regression is used to invert for the acoustic elastic constants as a function of depth without additional calibration. The multiple linear regression performed by the system is configured to model the relationship between two or more explanatory variables and a response variable by fitting a multiple linear equation to observed data. The resulting estimates are obtained cheaply in real-time or near real-time without the need of additional expensive sonic measurements. The information can be used to design completions and improve perforation efficiency.

Aspects of the subject technology optimize and calibrate a general linear mapping of sensor data to stress and strain using independently obtained elastic constant data. As a result, the accuracy of the regression analysis used to estimate the elastic constants is improved over alternative techniques of estimation of rock properties from drilling data. A discussion of some alternative approaches and their shortcomings are provided below. Aspects of the subject technology address shortcomings of these alternative approaches and provide for an improvement over these alternative approaches.

Drilling noise data may correlate well with mechanical rock properties and some techniques for estimation of rock properties may use drilling noise spectra to identify lithology, rock strength, presence of oil, presence of gas and the like. In some cases, a form of calibration using independently obtained elastic constants may be used. Some alternative approaches are configured to solve the following homogeneous system of equations for known elastic constants $C_{ij}$, $$\begin{bmatrix} -a_1 & 0 & 0 & d_1C_{11} & d_2C_{12} & d_3C_{13} \\ 0 & -a_2 & 0 & d_1C_{12} & d_2C_{11} & d_3C_{13} \\ 0 & 0 & -a_3 & d_1C_{13} & d_2C_{13} & d_3C_{33} \end{bmatrix} \begin{bmatrix} A \\ B \\ C \\ D \\ E \\ F \end{bmatrix} = 0 \quad (1)$$

The "a" terms and "d" terms refer to measured force (or acceleration) and displacement measurements derived from drilling data. This equation is a re-arrangement of the compressional stress-strain ($\sigma$–$\varepsilon$) relationship for a formation with vertical transversely isotropic (VTI) symmetry, $$\begin{bmatrix} \sigma_1 \\ \sigma_2 \\ \sigma_3 \end{bmatrix} = \begin{bmatrix} C_{11} & C_{12} & C_{13} \\ C_{12} & C_{11} & C_{13} \\ C_{13} & C_{13} & C_{33} \end{bmatrix} \begin{bmatrix} \varepsilon_1 \\ \varepsilon_2 \\ \varepsilon_3 \end{bmatrix}. \quad (2)$$

In the case of an isotropic formation $C_{33}=C_{11}$ and $C_{12}=C_{13}$. The calibration vector is a set of scaling constants that map the drilling data to stress and strain. Thus equation (2) is equivalent to equation (1) with $$\sigma_1 = Aa_1, \varepsilon_1 = Dd_1, \sigma_2 = Ba_2, \varepsilon_2 = Ed_2, \sigma_3 = Ca_3,$$
$$\text{and } \varepsilon_3 = Fd_3. \quad (3)$$

A scaling solution using singular value decomposition (SVD) may be found from an instance of the data:

$$\begin{bmatrix} A \\ B \\ C \\ D \\ E \\ F \end{bmatrix} = \rho_1 \begin{bmatrix} u_1 \\ u_2 \\ u_3 \\ u_4 \\ u_5 \\ u_6 \end{bmatrix} + \rho_2 \begin{bmatrix} v_1 \\ v_2 \\ v_3 \\ v_4 \\ v_5 \\ v_6 \end{bmatrix} + \rho_3 \begin{bmatrix} w_1 \\ w_2 \\ w_3 \\ w_4 \\ w_5 \\ w_6 \end{bmatrix}, \quad (4)$$

where the 6×1 column vectors u, v, and w are the zero-eigenvectors of the SVD decomposition of the 3×6 matrix of equation (1). The choice of ($\rho 1$, $\rho 2$, $\rho 3$) may be arbitrary and the solution ($\rho 1=1$, $\rho 2=\rho 3=0$) may be used. The scaling solution is fixed for all further processing. In some examples, data from drilling cement with known properties may be used. However, one drawback to these alternative calibration techniques is that the scaling solution may not work as well for other values of the elastic coefficients. As clarification, suppose the correct calibration for converting data to stress-strain is given by $$S \equiv \begin{bmatrix} A \\ B \\ C \\ D \\ E \\ F \end{bmatrix} \quad (5)$$

In general the solution, S', determined using the method described above, will be different, i.e. S'≠S due to the degeneracy of having three zero-eigenvectors. It is likely that new data, (a', d'), satisfying the true scaling, S, but for different elastic constants, $C_{ij}$', will not exactly satisfy equation (1), or equivalently equation (2), with the estimated S'. For example:

$$\begin{bmatrix} \sigma_1 \\ \sigma_2 \\ \sigma_3 \end{bmatrix} = \begin{bmatrix} Aa'_1 \\ Ba'_2 \\ Ca'_3 \end{bmatrix} = \begin{bmatrix} C'_{11} & C'_{12} & C'_{13} \\ C'_{12} & C'_{11} & C'_{13} \\ C'_{13} & C'_{13} & C'_{33} \end{bmatrix} \begin{bmatrix} \varepsilon_1 \\ \varepsilon_2 \\ \varepsilon_3 \end{bmatrix} = \begin{bmatrix} C'_{11} & C'_{12} & C'_{13} \\ C'_{12} & C'_{11} & C'_{13} \\ C'_{13} & C'_{13} & C'_{33} \end{bmatrix} \begin{bmatrix} Dd'_1 \\ Ed'_2 \\ Fd'_3 \end{bmatrix} \quad (6)$$

but usually:

$$\begin{bmatrix} A'a'_1 \\ B'a'_2 \\ C'a'_3 \end{bmatrix} \neq \begin{bmatrix} C'_{11} & C'_{12} & C'_{13} \\ C'_{12} & C'_{11} & C'_{13} \\ C'_{13} & C'_{13} & C'_{33} \end{bmatrix} \quad (7)$$

$$\begin{bmatrix} D'd'_1 \\ E'd'_2 \\ F'd'_3 \end{bmatrix} = \begin{bmatrix} D'd'_1 & E'd'_2 & F'd'_3 & 0 \\ F'd'_2 & D'd'_1 & F'd'_3 & 0 \\ 0 & 0 & (D'd'_1 + E'd'_2) & F'd'_3 \end{bmatrix} \begin{bmatrix} C'_{11} \\ C'_{12} \\ C'_{13} \\ C'_{33} \end{bmatrix}$$

A specific numerical example is shown below:
A=0.412862808173015; B=0.543956657160610;
C=0.365958060520887;
D=0.242715877845507; E=0.867051636244817;
F=0.709008181859393;
$a_1$=2.605219220535070; $a_2$=1.749470948875160;
$a_3$=3.616150158277514;
$d_1$=1.013567297159670; $d_2$=0.852013230145349;
$d_3$=0.909328513511015;
$C_{11}$=0.317732777600477; $C_{12}$=0.569354480210020;
$C_{13}$=0.894678680404625;
$C_{33}$=0.686073057028121.

An SVD scaling solution (three orthonormal zero-valued eigenvectors of the matrix in equation (1)) are:

$$u = \begin{bmatrix} 0.082545581834373 \\ 0.264303913853697 \\ 0.211115955776180 \\ 0.933064438287170 \\ -0.043929924111251 \\ -0.078871015141056 \end{bmatrix}; v = \begin{bmatrix} 0.155979022276073 \\ 0.107835077018896 \\ 0.181816295508710 \\ -0.044952428029207 \\ 0.962174470064409 \\ -0.056431762617977 \end{bmatrix};$$

$$w = \begin{bmatrix} 0.253501119298623 \\ 0.372432622314350 \\ 0.118656788031531 \\ -0.083177441895659 \\ -0.057587234372243 \\ 0.879043181306523 \end{bmatrix}.$$

In practice the true solution S is an unknown linear combination of [u,v,w]. The prior art suggests any linear combination of [u,v,w] will satisfy the stress strain relationship of equation (2) in all cases (cases other than the one used to solve for the eigenvectors. This is not true. If we choose the estimated solution as suggested in the prior art, S'=u, then equation (6) is satisfied but equation (7) is not. Let:
A'=$u_1$; B'=$u_2$; C'=$u_3$; D'=$u_4$; E'=$u_5$; F'=$u_6$;
d'$_1$=0.109680746406904; d'$_2$=0.663145080030699;
d'$_3$=0.954077199822116;
C'$_{11}$=0.827014474276367; C'$_{12}$=0.945381650565510;
C'$_{13}$=0.715887955463262; C'$_{33}$=0.713520374298564.

The accelerations are chosen to satisfy the true scaling of equation (6), a'$_1$=(C'$_{11}$Dd'$_1$+C'$_{12}$Ed'$_2$+C'$_{13}$Fd'$_3$)/A=2.542864167-863783;
a'$_2$=(C'$_{12}$Dd'$_1$+C'$_{11}$Ed'$_2$+C'$_{13}$Fd'$_3$)/B=1.8107072150-78647;
a'$_3$=(C'$_{13}$Dd'$_1$+C'$_{13}$Ed'$_2$+C'$_{33}$Fd'$_3$)/C=2.495749498699-005;

but they do not satisfy equation (7) using the estimated scaling,
A'a'$_1$=0.209902202262094≠(C'$_{11}$D'd'$_1$+C'$_{12}$E'd'$_2$+C'$_{13}$F'd'$_3$)=0.003225347546347
B'a'$_2$=0.478577003788414≠(C'$_{12}$D'd'$_1$+C'$_{11}$E'd'$_2$+C'$_{13}$F'd'$_3$)=0.018787212438398
C'a'$_3$=0.526892540795763≠(C'$_{13}$D'd'$_1$+C'$_{13}$E'd'$_2$+C'$_{33}$F'd'$_3$)=-0.0012835033364027

The farther the estimated scaling is from the true scaling and/or the new elastic constants from the ones used to estimate the scaling the greater the misfit to the stress-strain relationship.

The alternative technique described above assumes equality in equation (7) and suggests using it to solve for the new Cij. Since we are solving for the Cij using S' instead of the unknown S, the inequality will produce variability in the estimates of the Cij. Regarding equation (7), the technique described above assumes that, in practice because there are only three equations and four unknowns the solution is constrained by making an approximation where C12=C13. However, this assumption may or may not be appropriate. Additionally, the technique described above limits the calibration to a pre-supposed 1-to-1 mapping of specific scaled drilling data parameters to specific components of stress and strain.

Aspects of the subject technology propose a new, more stable method for calibration and estimation of elastic constants based on multiple linear regression and minimization of L2 norms (e.g., the Euclidean norm measuring the distance of the vector coordinate from the origin of the vector space). Various aspects of the subject technology also allow a general linear mapping of the drilling data to stress and strain including bias terms. Various aspects of the subject technology easily incorporate data fusion by allowing an arbitrary number of drilling data variables and data from other sensors in the calibration and estimation. Various aspects of the subject technology make it easy to optimize the calibration over numerous variables such as type of stress and/or strain excitation, type of drill bit, number of drilling parameters used in the inversion, and number of estimated acoustic properties. Additional technical advantages over other techniques will be noted in the detailed description. Thus, various aspects of the subject technology are both novel and improve the estimation of mechanical rock properties from drilling data.

FIG. 1A is a schematic diagram of an example Logging While Drilling wellbore operating environment, in accordance with various aspects of the subject technology. In FIG. 1A, a drilling arrangement is shown that exemplifies a Logging While Drilling (commonly abbreviated as LWD) configuration in a wellbore drilling scenario 50. Logging-While-Drilling typically incorporates sensors that acquire formation data. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 2 equipped with a derrick 4 that supports a hoist 6 for raising and lowering a drill string 8. The hoist 6 suspends a top drive 10 suitable for rotating and lowering the drill string 8 through a well head 12. A drill bit 14 can be connected to the lower end of the drill string 8. As the drill bit 14 rotates, it creates a wellbore 16 that passes through various subterranean formations 18. A pump 20 circulates drilling fluid through a supply pipe 22 to top drive 10, down through the interior of drill string 8 and out orifices in drill bit 14 into the wellbore. The drilling fluid returns to the surface via the annulus around drill string 8, and into a retention pit 24. The drilling fluid transports cuttings from the wellbore 16 into the retention pit 24 and the drilling fluid's presence in the annulus aids in maintaining the integrity of the wellbore 16. Various materials can be used for drilling fluid, including oil-based fluids and water-based fluids.

Logging tools 26 can be integrated into the bottom-hole assembly 25 near the drill bit 14. As the drill bit 14 extends the wellbore 16 through the formations 18, logging tools 26 collect measurements relating to various formation properties as well as the orientation of the tool and various other drilling conditions. The bottom-hole assembly 25 may also include a telemetry sub 28 to transfer measurement data to a surface receiver 32 and to receive commands from the surface. In at least some cases, the telemetry sub 28 communicates with a surface receiver 32 using mud pulse telemetry. In some instances, the telemetry sub 28 does not communicate with the surface, but rather stores logging data for later retrieval at the surface when the logging assembly is recovered.

Each of the logging tools 26 may include one or more tool components spaced apart from each other and communicatively coupled by one or more wires and/or other communication arrangement. The logging tools 26 may also include one or more computing devices communicatively coupled with one or more of the tool components. The one or more computing devices may be configured to control or monitor a performance of the tool, process logging data, and/or carry out one or more aspects of the methods and processes of the present disclosure.

In at least some instances, one or more of the logging tools 26 may communicate with a surface receiver 32 by a wire, such as wired drill pipe. In other cases, the one or more of the logging tools 26 may communicate with a surface receiver 32 by wireless signal transmission. In at least some cases, one or more of the logging tools 26 may receive electrical power from a wire that extends to the surface, including wires extending through a wired drill pipe.

Collar 34 is a frequent component of a drill string 8 and generally resembles a very thick-walled cylindrical pipe, typically with threaded ends and a hollow core for the conveyance of drilling fluid. Multiple collars 34 can be included in the drill string 8 and are constructed and intended to be heavy to apply weight on the drill bit 14 to assist the drilling process. Because of the thickness of the collar's wall, pocket-type cutouts or other type recesses can be provided into the collar's wall without negatively impacting the integrity (strength, rigidity and the like) of the collar as a component of the drill string 8.

Figure 1B:
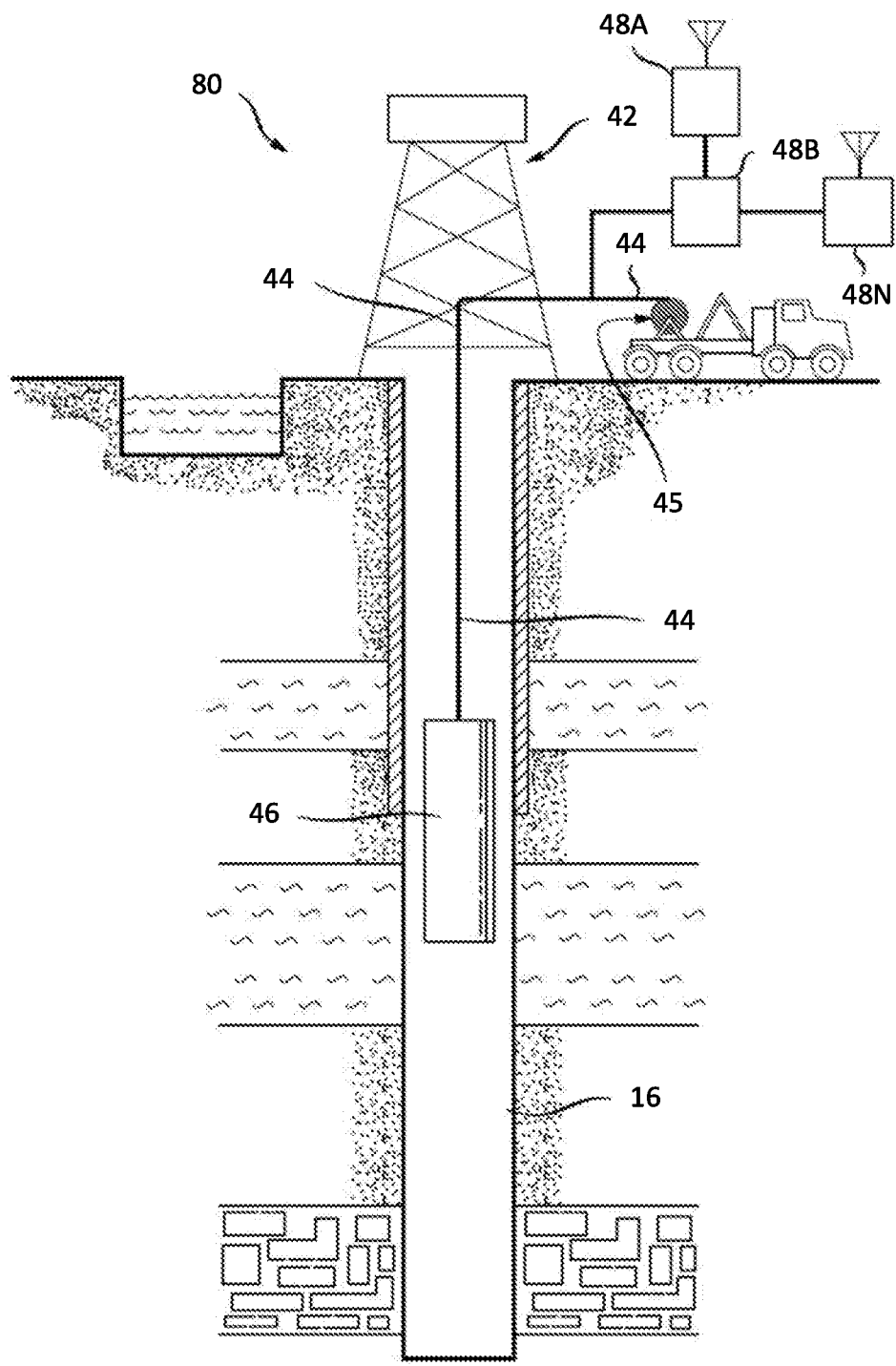
FIG. 1B is a schematic diagram of an example downhole environment, post drilling, in accordance with various aspects of the subject technology.

FIG. 1B is a schematic diagram of an example downhole environment, post drilling, in accordance with various aspects of the subject technology. In FIG. 1B, an example system 80 is depicted for conducting downhole measurements after at least a portion of a wellbore has been drilled and the drill string removed from the well. A downhole tool is shown having a tool body 46 in order to carry out logging and/or other operations. For example, instead of using the drill string 8 of FIG. 1A to lower tool body 46, which can contain sensors and/or other instrumentation for detecting and logging nearby characteristics and conditions of the wellbore 16 and surrounding formations, a wireline conveyance 44 can be used. The tool body 46 can be lowered into the wellbore 16 by wireline conveyance 44. The wireline conveyance 44 can be anchored in the drill rig 42 or by a portable means such as a truck 45. The wireline conveyance 44 can include one or more wires, slicklines, cables, and/or the like, as well as tubular conveyances such as coiled tubing, joint tubing, or other tubulars.

The illustrated wireline conveyance 44 provides power and support for the tool, as well as enabling communication between data processors 48A-N on the surface. In some examples, the wireline conveyance 44 can include electrical and/or fiber optic cabling for carrying out communications. The wireline conveyance 44 is sufficiently strong and flexible to tether the tool body 46 through the wellbore 16, while also permitting communication through the wireline conveyance 44 to one or more of the processors 48A-N, which can include local and/or remote processors. Moreover, power can be supplied via the wireline conveyance 44 to meet power requirements of the tool. For slickline or coiled tubing configurations, power can be supplied downhole with a battery or via a downhole generator.

Figure 2:
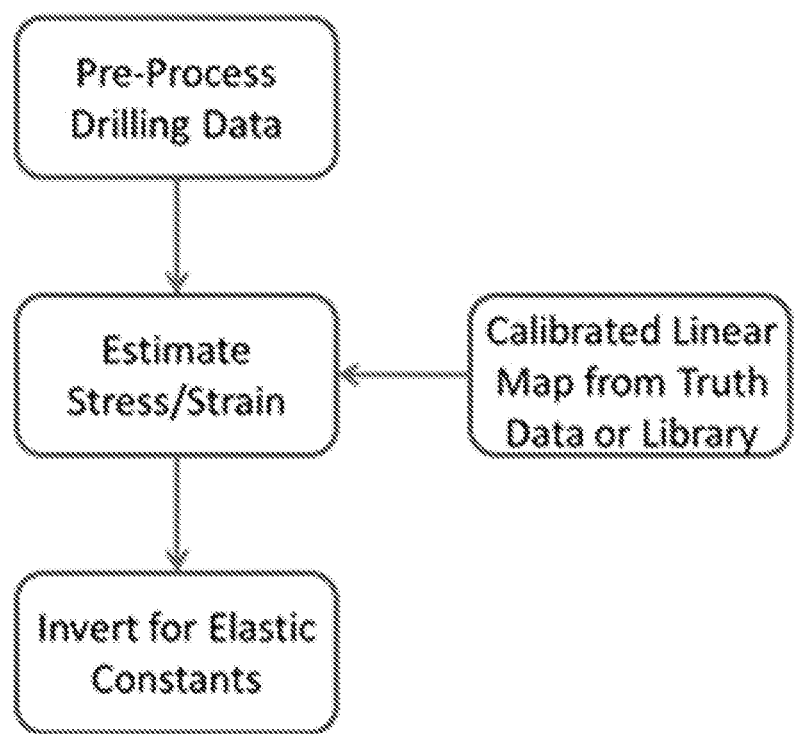
FIG. 2 is a flow diagram showing a top-level workflow for estimating elastic constants from drilling data, in accordance with various aspects of the subject technology.

FIG. 2 is a flow diagram showing a top-level workflow for estimating elastic constants from drilling data while drilling using calibration from an offset well, in accordance with various aspects of the subject technology. The example workflow shown in FIG. 2 shows a number of stages in a particular configuration. However, other workflows may include additional stages, fewer stages, or alternative stages. Furthermore, the stages may be in different configurations in accordance with other aspects of the subject technology. At a high level, the workflow for estimating elastic constants from drilling data consists of using a calibrated linear mapping to determine stress and strain from the drilling data. The stress and strain are then inverted and used to estimate the elastic constants of the formation. The drilling data generally requires pre-processing before estimating the stress and strain. The different stages of the workflow are discussed in further detail below.

Figure 3:
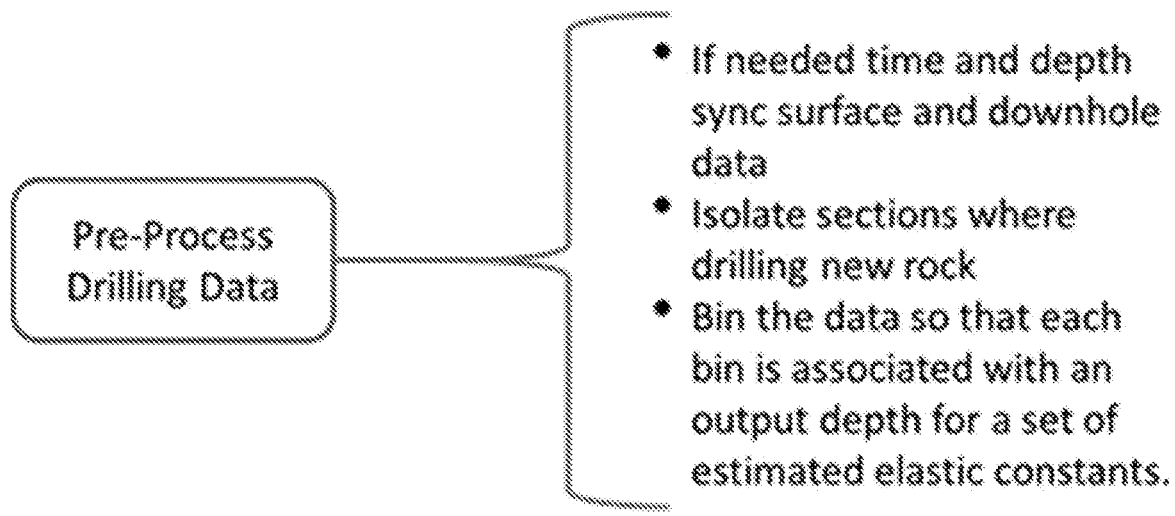
FIG. 3 is a diagram illustrating a workflow for preprocessing drilling data, in accordance with various aspects of the subject technology.

FIG. 3 is a diagram illustrating a workflow for pre-processing drilling data, in accordance with various aspects of the subject technology. The drilling data used in the method may consist of surface data, downhole data, both, or other data. As an example surface data may consist of (but is not limited to) time and depth tagged variables such as weight on bit (WOB), rate of penetration (ROP), and torque on bit (TOB). These variables may be measured downhole using stress and strain gauges together with downhole navigation data from some combination of accelerometers, gyros, and magnetometers. Some or all of the sensors may be placed at or near the drill bit. The downhole data may be time tagged.

In some embodiments, a system may be configured to synchronize the downhole and surface clocks so that downhole data can be associated with depth. The surface data may be collected at a lower data rate than the downhole data and may be up-sampled to match the downhole data rate. The system is configured to collect and interpolate all the data variables from different sources to the same rate and correctly associated with depth/time tags. After synchronization, the data collected while drilling new rock may be extracted for further processing. Finally, the data is parsed into bins. Each bin is associated with an output set of elastic constants (Cij) for a given output depth. Data from other sensors may also be used in the calibration and estimation such as real-time density and gamma ray measurements.

After pre-processing the drilling data, the data is linearly mapped to stress and strain using a previously computed calibration result determined as follows. The system is configured to compute elastic constants as a function of depth using an external source. For example acoustic waveforms from a wireline acoustic tool could be processed to estimate anisotropic compressional and shear velocities. Some combination of these velocities, assumed acoustic relationships, anisotropy estimates, and bulk density estimates can be used to compute elastic constants versus depth. According to some embodiments, a horizontal transverse isotropy (HTI) and vertical transverse isotropy (VTI) algorithms may be used to estimate the anisotropy. These elastic constants are treated as ground truth for calibration.

Figure 4:
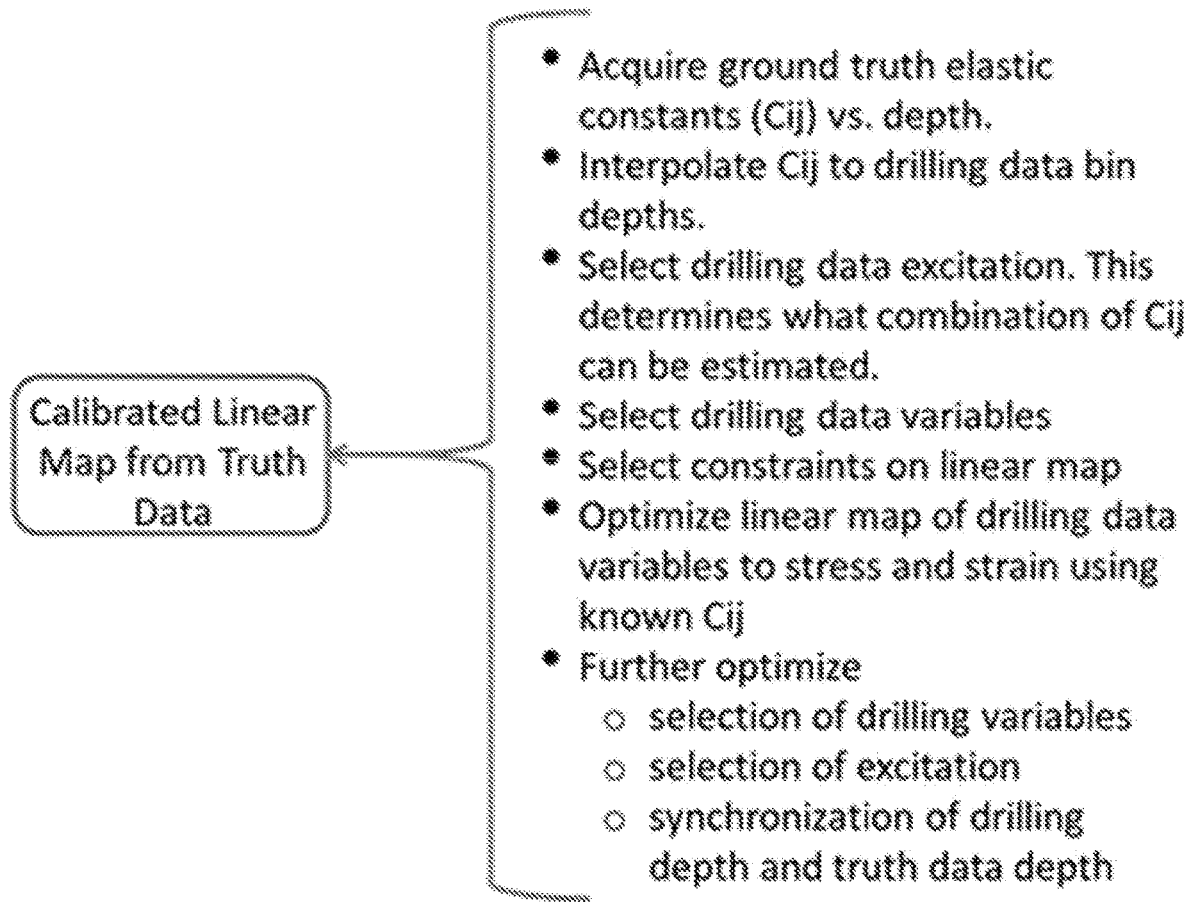
FIG. 4 is a diagram illustrating a calibration workflow, in accordance with various aspects of the subject technology.

FIG. 4 is a diagram illustrating a calibration workflow, in accordance with various aspects of the subject technology. After acquiring ground truth data it is interpolated to the drilling data depths. Then the allowed drilling data excitations are chosen. This determines which Cij values or related combinations (e.g. Young's modulus) can be estimated from the drilling data. A linear map is proposed (with optional constraints) for transforming a chosen set of drilling data variables into stress and strain values. Since stress is related to strain through the known elastic constants, the system can estimate the optimal linear map using multiple linear regression. The system may further optimize the linear map by trying different combinations of drilling data, constraints on the linear map, and allowed excitations. The optimized linear map can be applied to other nearby wells as shown in FIG. 2 to invert for the elastic constants in those wells. Over time a library of linear maps can be developed and catalogued with respect to various parameters such as regional lithology and drill bit type.

Linear Regression Formulas for Inversion of Elastic Constants from Stress and Strain The stresses, $\vec{\sigma}$, and strains, $\vec{\varepsilon}$, are related through the elastic constant matrix, C, $$\vec{\sigma} = C\vec{\varepsilon}. \tag{8}$$

In a vertical well with horizontal layers the elastic constant matrix has VTI (Vertical Transverse Isotropy) symmetry, $$C = \begin{bmatrix} C_{11} & C_{12} & C_{13} & 0 & 0 & 0 \\ C_{12} & C_{11} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{66} \end{bmatrix} \equiv \begin{bmatrix} C_P & 0_{3\times 3} \\ 0_{3\times 3} & C_S \end{bmatrix}, \tag{9}$$

where $C_P$ and $C_S$ are the 3×3 compressional and shear elastic constant matrices respectively, and $$C_{12} = C_{11} - 2C_{66}. \tag{10}$$

We will focus on the compressional matrix since methods developed there are easily applied to the diagonal shear matrix. Multiple linear regression is used to estimate the elastic constants by minimizing the L2 norm square difference for a depth bin, $$O = \sum_k (C_P \vec{\varepsilon}_{P,k} - \vec{\sigma}_{P,k})'(C_P \vec{\varepsilon}_{P,k} - \vec{\sigma}_{P,k}), \tag{11}$$

with respect to the elastic constants, where $$\vec{\varepsilon}_{P,k} = \begin{bmatrix} \varepsilon_{1,k} \\ \varepsilon_{2,k} \\ \varepsilon_{3,k} \end{bmatrix}, \vec{\sigma}_P = \begin{bmatrix} \sigma_{1,k} \\ \sigma_{2,k} \\ \sigma_{3,k} \end{bmatrix}, \tag{12}$$

and the objective function sums over all data samples, k, in the depth bin. Minimization of equation (11) can be done in various ways. One embodiment uses a matrix equation derived by setting the partial derivatives of the elastic constants to zero. The choice of allowed excitations determines which components or combination of components of $C_P$ can be estimated. The results can be optimized with respect to allowed excitation. This is an improvement over the other techniques, which do involve the selection of excitation.

The strain eigenvectors of $C_P$ are:

$$\vec{u}_+ = \begin{bmatrix} a_+ \\ a_+ \\ b_+ \end{bmatrix}, \vec{u}_- = \begin{bmatrix} a_- \\ a_- \\ b_- \end{bmatrix}, \vec{u}_0 = \begin{bmatrix} a_0 \\ -a_0 \\ 0 \end{bmatrix}, \tag{13}$$

where $$\frac{b_\pm}{a_\pm} = -\frac{(C_{11} + C_{12} - \lambda_\pm)}{C_{13}} = -\frac{2C_{13}}{(C_{33} - \lambda_\pm)}, \tag{14}$$

and the eigenvalues are:

$$\lambda_0 = (C_{11} - C_{12}) = 2C_{66}, \tag{15}$$

$$\lambda_\pm = \frac{(C_{11} + C_{12} + C_{33}) \pm \sqrt{(C_{11} + C_{12} + C_{33})^2 - 4[C_{33}(C_{11} + C_{12}) - 2C_{13}^2]}}{2}.$$

The following lists the regression formulas for different combinations of excitations.

A) Excite +/−/0. This requires an estimate of all 6 stresses and strains. Minimization of the objective function yields (sum over k implied)

$$\begin{bmatrix} 2(\varepsilon_{1,k}^2 + \varepsilon_{2,k}^2) & 4\varepsilon_{1,k}\varepsilon_{2,k} & 2\begin{pmatrix} \varepsilon_{1k}\varepsilon_{3,k} + \\ \varepsilon_{2,k}\varepsilon_{3,k} \end{pmatrix} & 0 \\ 4\varepsilon_{1,k}\varepsilon_{2,k} & 2(\varepsilon_{1,k}^2 + \varepsilon_{2,k}^2) & 2\begin{pmatrix} \varepsilon_{1k}\varepsilon_{3,k} + \\ \varepsilon_{2,k}\varepsilon_{3,k} \end{pmatrix} & 0 \\ 2\begin{pmatrix} \varepsilon_{1,k}\varepsilon_{3,k} + \\ \varepsilon_{2,k}\varepsilon_{3,k} \end{pmatrix} & 2\begin{pmatrix} \varepsilon_{1,k}\varepsilon_{3,k} + \\ \varepsilon_{2,k}\varepsilon_{3,k} \end{pmatrix} & 2\begin{pmatrix} \varepsilon_{1,k}^2 + \\ \varepsilon_{2,k}^2 + \\ 2\varepsilon_{3,k}^2 \end{pmatrix} + 4\varepsilon_{1,k}\varepsilon_{2,k} & 2\begin{pmatrix} \varepsilon_{1,k}\varepsilon_{3,k} + \\ \varepsilon_{2,k}\varepsilon_{3,k} \end{pmatrix} \\ 0 & 0 & 2\begin{pmatrix} \varepsilon_{1k}\varepsilon_{3,k} + \\ \varepsilon_{2,k}\varepsilon_{3,k} \end{pmatrix} & 2\varepsilon_{3,k}^2 \end{bmatrix} \tag{16}$$

$$\begin{bmatrix} C_{11} \\ C_{12} \\ C_{13} \\ C_{33} \end{bmatrix} = \begin{bmatrix} 2(\sigma_{1,k}\varepsilon_{1,k} + \sigma_{2,k}\varepsilon_{2,k}) \\ 2(\sigma_{1,k}\varepsilon_{2,k} + \sigma_{2,k}\varepsilon_{1,k}) \\ 2\begin{pmatrix} \sigma_{3,k}\varepsilon_{1,k} + \sigma_{1,k}\varepsilon_{3,k} + \\ \sigma_{3,k}\varepsilon_{2,k} + \sigma_{2,k}\varepsilon_{3,k} \end{pmatrix} \\ 2\sigma_{3,k}\varepsilon_{3,k} \end{bmatrix}.$$

This example is a more robust method than equation (7) from other techniques. It is a novel multiple linear regression that allows estimation of all four compressional Cij without using the assumption $C_{12}=C_{13}$ because the matrix is a 4×4 matrix instead of a 3×4 matrix. The summation over k not taught in the other techniques also reduces the effect of noise.

B) Excite +/−. This requires an estimate of all 4 stresses and strains ($\varepsilon_1=\varepsilon_2$, $\sigma_1=\sigma_2$). Minimization of the objective function yields $$\begin{bmatrix} \sum_k \varepsilon_{1,k}^2 & \sum_k \varepsilon_{1,k}\varepsilon_{3,k} & 0 \\ 0 & 2\sum_k \varepsilon_{1,k}\varepsilon_{3,k} & \sum_k \varepsilon_{3,k}^2 \\ \sum_k \varepsilon_{1,k}\varepsilon_{3,k} & \sum_k (4\varepsilon_{1,k}^2+\varepsilon_{3,k}^2) & 2\sum_k \varepsilon_{1,k}\varepsilon_{3,k} \end{bmatrix} \quad (17)$$

$$\begin{bmatrix} (C_{11}+C_{12}) \\ C_{13} \\ C_{33} \end{bmatrix} = \begin{bmatrix} \sum_k \sigma_{1,k}\varepsilon_{1,k} \\ \sum_k \sigma_{3,k}\varepsilon_{3,k} \\ \sum_k \sigma_{1,k}\varepsilon_{3,k}+2\sigma_{3,k}\varepsilon_{1,k} \end{bmatrix}.$$

Other techniques solve for Poisson's ratio and ($C_{11}+C_{12}$), or alternatively for Poisson's ratio and Young's modulus, using a straight line fit to drilling data. Thus these techniques result in two separate, different Poisson's ratios and do not resolve the discrepancy. Aspects of the subject technology enable a system to directly solve for ($C_{11}+C_{12}$), $C_{13}$, and $C_{33}$, from which Poisson's ratio and Young's modulus can be unambiguously determined using:

$$v_{31} = \frac{C_{13}}{(C_{11}+C_{12})}, \text{ and } E_3 = C_{33}-2v_{31}C_{13}. \quad (18)$$

Determining more of the elastic constants requires additional information and/or assumptions. Shear elastic constants can be found using linear regression if the shear stresses and strains can be estimated form the drilling data. Alternatively, additional LWD sensors could be added to the drill string (economically reasonable for a calibration run where acoustic data is required).

Example 1: $C_{44}=C_{55}$ known in real time from LWD Gamma Ray density and LWD acoustic tool measuring S-wave. Assume a known epsilon-gamma ratio EGR=β. Then $$C_{66} = \frac{C_{33}c_{44}}{(C_{44}-\beta C_{33})}\left[1-\beta-\frac{(C_{11}+C_{12})}{2C_{33}}\right], \quad (19)$$

$$C_{11} = \frac{(C_{11}+C_{12})}{2}+C_{66}.$$

Example 2: Assume $C_{12}=\alpha C_{13}$ with known α. Then we can get $C_{11}$ and $C_{66}$. If the measurement of $C_{44}$ is known, the remaining unknown variables may be resolved.

Example 3: $C_{66}$ is known in real time from LWD Gamma Ray density and LWD acoustic tool measuring Stoneley wave velocity. The example may involve a tool correction to the Stoneley wave velocity. Then $$C_{11} = \frac{(C_{11}+C_{12})}{2}+C_{66}. \quad (20)$$

Without an estimate of $\varepsilon_1$, one can still estimate Young's modulus and Poisson's ratio. Minimization of the objective function $$O = \sum_k (\sigma_{3,k}-2v_{31}\sigma_{1,k}-E_3\varepsilon_{3,k})^2$$

reduced from equation (11) yields:

$$\begin{bmatrix} \sum_k \varepsilon_{3,k}\sigma_{3,k} \\ \sum_k \sigma_{3,k}\sigma_{1,k} \end{bmatrix} = \begin{bmatrix} \sum_k \varepsilon_{3,k}^2 & \sum_k \varepsilon_{3,k}\sigma_{1,k} \\ \sum_k \varepsilon_{3,k}\sigma_{1,k} & \sum_k \sigma_{1,k}^2 \end{bmatrix} \begin{bmatrix} E_3 \\ 2v_{31} \end{bmatrix}, \quad (21)$$

where Young's modulus, $E_3$, and Poisson's ratio, $v_{31}$, are given by:

$$E_3 = C_{33}-2v_{31}C_{13} = C_{33}-\frac{2C_{13}^2}{(C_{11}+C_{12})}, \quad (22)$$

$$v_{31} = \frac{C_{13}}{(C_{11}+C_{12})}.$$

Other techniques only use estimation of Young's modulus and Poisson's ratio (or Poisson's ratio and $C_{11}+C_{12}$) from a straight line linear regression analysis applied to stress-stress, strain-strain, and or stress-strain ratios (e.g., slope and y-intercept directly give Young's modulus and Poisson's ratio). Aspects of the subject technology differ from these other techniques as aspects of the subject technology may utilize a multiple linear regression (fits stress and strain to a plane).

C) Excite +/0. This requires an estimate of 5 stresses and strains, $\varepsilon_3=(\varepsilon_1+\varepsilon_2)b_+/2$. Minimization of the objective function yields $$\begin{bmatrix} \sum_k (\varepsilon_{1,k}+\varepsilon_{2,k})^2 & 0 & 0 \\ 0 & \sum_k (\varepsilon_{1,k}-\varepsilon_{2,k})^2 & 0 \\ 0 & 0 & \sum_k (\varepsilon_{1,k}+\varepsilon_{2,k})^2 \end{bmatrix} \begin{bmatrix} \lambda_+ \\ \lambda_0 \\ \lambda_+ b_+ \end{bmatrix} = \quad (23)$$

$$\begin{bmatrix} \sum_k (\sigma_{1,k}+\sigma_{2,k})(\varepsilon_{1,k}+\varepsilon_{2,k}) \\ \sum_k (\sigma_{1,k}-\sigma_{2,k})(\varepsilon_{1,k}-\varepsilon_{2,k}) \\ 2\sum_k \sigma_{3,k}(\varepsilon_{1,k}+\varepsilon_{2,k}) \end{bmatrix}.$$

Converting from eigenvalues to elastic constants requires additional information. Shear elastic constants can be found using linear regression if the shear stresses and strains can be estimated form the drilling data. Alternatively, additional LWD sensors could be added to the drill string.

Example 1: $C_{33}$ known in real time from LWD Gamma Ray density and LWD acoustic tool measuring P-wave. Then:

$$C_{66} = \lambda_0/2,\ C_{13} = -\frac{b_+(C_{33} - \lambda_+)}{2}, \qquad (24)$$
$$C_{11} = \frac{\lambda_+ + \lambda_0 - C_{13}b_+}{2},\ C_{12} = \frac{\lambda_+ - \lambda_0 - C_{13}b_+}{2}.$$

Example 2: $C_{44}=C_{55}$ known in real time from LWD Gamma Ray density and LWD acoustic tool measuring S-wave. Assume a known epsilon-gamma ratio EGR=β. Then:

$$C_{66} = \lambda_0/2,\ C_{33} = \frac{b_+^2\lambda_+ - 2(\lambda_+ + \lambda_0)}{(b_+^2 - 4\kappa)},\ C_{11} = C_{33}\kappa, \qquad (25)$$
$$C_{13} = \frac{b_+(\lambda_+ + \lambda_0) - 2\kappa b_+ \lambda_+}{(b_+^2 - 4\kappa)},\ C_{12} = \frac{\lambda_+ - \lambda_0 - C_{13}b_+}{2},$$

where $\kappa \equiv 1-\beta+\beta C_{66}/C_{44}$.

Example 3: Assume $C_{12} = \alpha C_{13}$ for known α.

$$C_{66} = \lambda_0/2,\ C_{11} = \frac{\lambda_+ + \lambda_0 - b_+}{2},\ C_{12} = C_{11} - \lambda_0, \qquad (26)$$
$$C_{13} = C_{12}/\alpha,\ C_{33} = \frac{\lambda_+ b_+ - 2C_{13}}{b_+}.$$

D) Excite −/0. Same equations as +/0 with the substitution +→−.

Calibration Formulas for Estimating Compressional Stress and Strain from Drilling Data This section focuses on compressional stress and strain, with the understanding that similar methods can be applied to the shear stress and strain. Let $n=1, \ldots, N_D$ be output depth bin index and $k=1, \ldots, K_n$ be drilling data index. Define a generic log matrix:

$$[\vec{L}_{n1} \ldots \vec{L}_{nK_n}] = \begin{bmatrix} ROP_{n1} & \ldots & ROP_{n,K_n} \\ WOB_{n1} & \ldots & WOB_{n,K_n} \\ TOB_{n1} & \ldots & TOB_{n,K_n} \\ \vdots & \vdots & \vdots \\ GR_n & \ldots & GR_n \end{bmatrix}, \qquad (27)$$

where the length $N_L$ column vectors are $$\vec{L}_{nk} = \begin{bmatrix} ROP_{nk} \\ WOB_{nk} \\ TOB_{nk} \\ \vdots \\ GR_n \end{bmatrix} \equiv \begin{bmatrix} L_{1,nk} \\ L_{2,nk} \\ L_{3,nk} \\ \vdots \\ L_{N_L,n} \end{bmatrix}. \qquad (28)$$

Note the gamma ray, GR, is duplicated to length $K_n$. The calibration assumes a general linear mapping of stress and strain to the logs, $$\vec{\varepsilon}_{P,nk} = A_\varepsilon \vec{L}_{nk} + \vec{B}_\varepsilon,\ \vec{\varepsilon}_{P,nk} = \begin{bmatrix} \varepsilon_{1,nk} \\ \varepsilon_{2,nk} \\ \varepsilon_{3,nk} \end{bmatrix},\ A_\varepsilon = 3 \times N_L,\ \vec{B}_\varepsilon = 3 \times 1, \qquad (29)$$

$$\vec{\sigma}_{P,nk} = A_\sigma \vec{L}_{nk} + \vec{B}_\sigma,\ \vec{\sigma}_{P,nk} = \begin{bmatrix} \sigma_{1,nk} \\ \sigma_{2,nk} \\ \sigma_{3,nk} \end{bmatrix}, \qquad (30)$$

$$A_\sigma = 3 \times N_L,\ \vec{B}_\sigma = 3 \times 1,$$

where the linear mapping, ($A_\varepsilon$, $\vec{B}_\varepsilon$, $A_\sigma$, $\vec{B}_\sigma$), is a global constant, independent of depth.

Note the logs can be any external data that maps to stress and strain through the general linear map defined above. The linear map includes a bias term. The general linear map is an important improvement over the conventional techniques which only allow a 1-to-1 scaling. The bias term makes it possible to remove systemic biased error from the data. Aspects of the subject technology allow for using more logs than number of stresses and strains. This makes a data fusion approach easy to implement and is an improvement over prior techniques. This also facilitates optimizing with respect to number and choice of logs simultaneously with excitation type.

It can be assumed that truth data exists for at least some of the elastic constants comprising the matrix $C_n$ (subscript P has been dropped for convenience) consistent with the chosen multiple linear regression analysis from the previous section discussing excitations.

$$C_n = \begin{bmatrix} C_{11,n} & C_{12,n} & C_{13,n} \\ C_{12,n} & C_{11,n} & C_{13,n} \\ C_{13,n} & C_{13,n} & C_{33,n} \end{bmatrix}. \qquad (31)$$

These can be computed using wireline acoustic data, anisotropy estimation algorithms, a density log, and some assumed geo-mechanics relationships. The calibration is accomplished by minimizing the global objective function, $$O_g = \sum_{n=1}^{N_d} \sum_{k=1}^{K_n} (\vec{\sigma}_{P,nk} - C_{P,n}\vec{\varepsilon}_{P,nk})'(\vec{\sigma}_{P,nk} - C_{P,n}\vec{\varepsilon}_{P,nk}), \qquad (32)$$

with respect to the linear map. As compared with other techniques, aspects of the subject technology are far more robust and stable with respect to noise since many different $C_n$ are used to estimate the calibration. After substitution of the generalized linear map the global L2 norm objective function takes the form $$O_g = \sum_{n=1}^{N_d} \sum_{k=1}^{K_n} \left(A_\sigma \vec{L}_{nk} + \vec{B}_\sigma - C_{P,n}A_\varepsilon \vec{L}_{nk} - C_{P,n}\vec{B}_\varepsilon\right)' \qquad (33)$$
$$\left(A_\sigma \vec{L}_{nk} + \vec{B}_\sigma - C_{P,n}A_\varepsilon \vec{L}_{nk} - C_{P,n}\vec{B}_\varepsilon\right).$$

Minimization of equation (33) can be done in various ways. For example a system may use a matrix equation derived by setting the partial derivatives of the linear map to zero. The linear map may also be partially constrained. For example, the generalized linear map may be assumed to be diagonal, e.g., each stress and strain maps uniquely to one of the logs using a bias and scale factor. The form of the calibration equations depends on the excitation choice from the previous section and the constraints applied to the linear map. Calibration equations for the regression of equation (16) with the mapping completely unconstrained are fairly complicated. The solution vector is defined as $$\vec{x} = [A_{\varepsilon,11}, \ldots, A_{\varepsilon,1N_L}, A_{\varepsilon,21}, \ldots, A_{\varepsilon,2N_L}, A_{\varepsilon,31}, \ldots, \\ A_{\varepsilon,3N_L}, A_{\sigma,12}, \ldots, A_{\varepsilon,1N_L}, A_{\sigma,21}, \ldots, A_{\sigma,2N_L}, \\ A_{\sigma,31}, \ldots, A_{\sigma,3N_L}, B_{\varepsilon,1}, B_{\varepsilon,2}, B_{\varepsilon,3}, B_{\sigma,1}, B_{\sigma,2}, B_{\sigma,3}]' \quad (34)$$

where without loss of generality we set $A_{\sigma,11}=1$. All the unknowns may be normalized with respect to $A_{\sigma,11}$. In this case the solution is $$\vec{x} = M^{-1}\vec{y}, \quad (35)$$

where M and $\vec{y}$ are found from the partial derivatives of the objective function, $$\partial_{x_i} O_g = \sum_j M_{ij} x_j - y_i = 0. \quad (36)$$

In the event that M is singular a pseudo-inverse may be used. Given good statistics for this example, there is always one zero eigenvector corresponding to $A_{\sigma,11}=0$, but it can be disregarded since it is truly degenerate and satisfies the stress-strain relationship for all stiffness coefficients unlike other alternative techniques.

The matrix M is large, so only the first diagonal block of M is shown. The first diagonal block of M couples partial derivatives of the objective function with respect to elements of $A_\varepsilon$ to the elements of $A_\varepsilon$ in x. These terms arise from the part of the objective function that is quadratic in $A_\varepsilon$, $$\sum_{n=1}^{Nd} \sum_{k=1}^{K_n} \left\{ \sum_{i,j=1}^{N_L} L_{i,nk} [A'_\varepsilon C_n^2 A_\varepsilon]_{ij} L_{j,nk} \right\}. \quad (37)$$

Partial derivatives of equation (37) with respect to $A_{\varepsilon,pq}$ give $$M_{rs} = 2 \sum_{n=1}^{Nd} \sum_{k=1}^{K_n} L_{q(r),nk} [C_n^2]_{p(r),m(s)} L_{j(s),nk}, \quad (38)$$

for $r, s = 1, \ldots, 3N_L$, where $$p = \lfloor (r-1)/N_L \rfloor + 1, \; m = \lfloor (s-1)/N_L \rfloor + 1, \\ q = \mathrm{rem}(r-1, N_L) + 1, \; j = \mathrm{rem}(s-1, N_L) + 1. \quad (39)$$

There is no contribution to y from equation (37). Other parts of the matrix M and vector y can be determined similarly. Calibration equations are much simpler for the regression of equation (21) with a diagonal constraint for the linear map, $$\sigma_{3,nk} = L_{\sigma,nk} A_\sigma + B_\sigma, \varepsilon_{3,nk} = L_{\varepsilon,nk} A_\varepsilon + B_\varepsilon, \sigma_{1,nk} = L_{1,nk} A_1 + B_1. \quad (40)$$

This example results in $$\begin{bmatrix} \sum_{n,k} E_n^2 L_{\varepsilon,nk}^2 & \sum_{n,k} E_n v_n L_{\varepsilon,nk} L_{1,nk} & \sum_{n,k} E_n^2 L_{\varepsilon,nk} & \sum_{n,k} E_n v_n L_{\varepsilon,nk} & -\sum_{n,k} E_n L_{\varepsilon,nk} \\ \sum_{n,k} E_n v_n L_{\varepsilon,nk} L_{1,nk} & \sum_{n,k} v_n^2 L_{1,nk}^2 & \sum_{n,k} E_n v_n L_{1,nk} & \sum_{n,k} v_n^2 L_{1,nk} & -\sum_{n,k} v_n L_{1,nk} \\ \sum_{n,k} E_n^2 L_{\varepsilon,nk} & \sum_{n,k} E_n v_n L_{1,nk} & \sum_{n} E_n^2 K_n & \sum_{n,k} E_n v_n K_n & -\sum_{n,k} E_n K_n \\ \sum_{n,k} E_n v_n L_{\varepsilon,nk} & \sum_{n,k} v_n^2 L_{1,nk} & \sum_{n} E_n v_n K_n & \sum_{n} v_n^2 K_n & -\sum_{n} v_n K_n \\ -\sum_{n,k} E_n L_{\varepsilon,nk} & -\sum_{n,k} v_n L_{1,nk} & -\sum_{n} E_n K_n & -\sum_{n} v_n K_n & N_T \end{bmatrix} \begin{bmatrix} A_\varepsilon \\ A_1 \\ B_\varepsilon \\ B_1 \\ B_\sigma \end{bmatrix} = \begin{bmatrix} \sum_{n,k} E_n L_{\varepsilon,nk} L_{\sigma,nk} \\ \sum_{n,k} v_n L_{1,nk} L_{\sigma,nk} \\ \sum_{n,k} E_n L_{\sigma,nk} \\ \sum_{n,k} v_n L_{3,nk} \\ -\sum_{n,k} L_{\sigma,nk} \end{bmatrix} \quad (41)$$

where $V=2v_{31}$, $E=E_3$, and without loss of generality $A_\sigma$ is set to 1.

Other calibration formulas can similarly be determined for the other regression formulas of intermediate difficulty compared to these two extreme examples. One can optimize the choice of excitation/regression and calibration equations for an oil field depending on the availability and quality of the drilling data, sensor data, and truth data. Over time a library of linear maps can also be developed and catalogued with respect to various parameters such as regional lithology and drill bit type.

According to some embodiments, the minimizations discussed above may be done in various ways other than the matrix equations above. Minimization algorithms such as synthetic annealing or conjugate gradient may also be used.

According to some embodiments the calibrations described above may be interpreted as neural networks jointly training each other through the stress-strain relationship.

Figure 5:
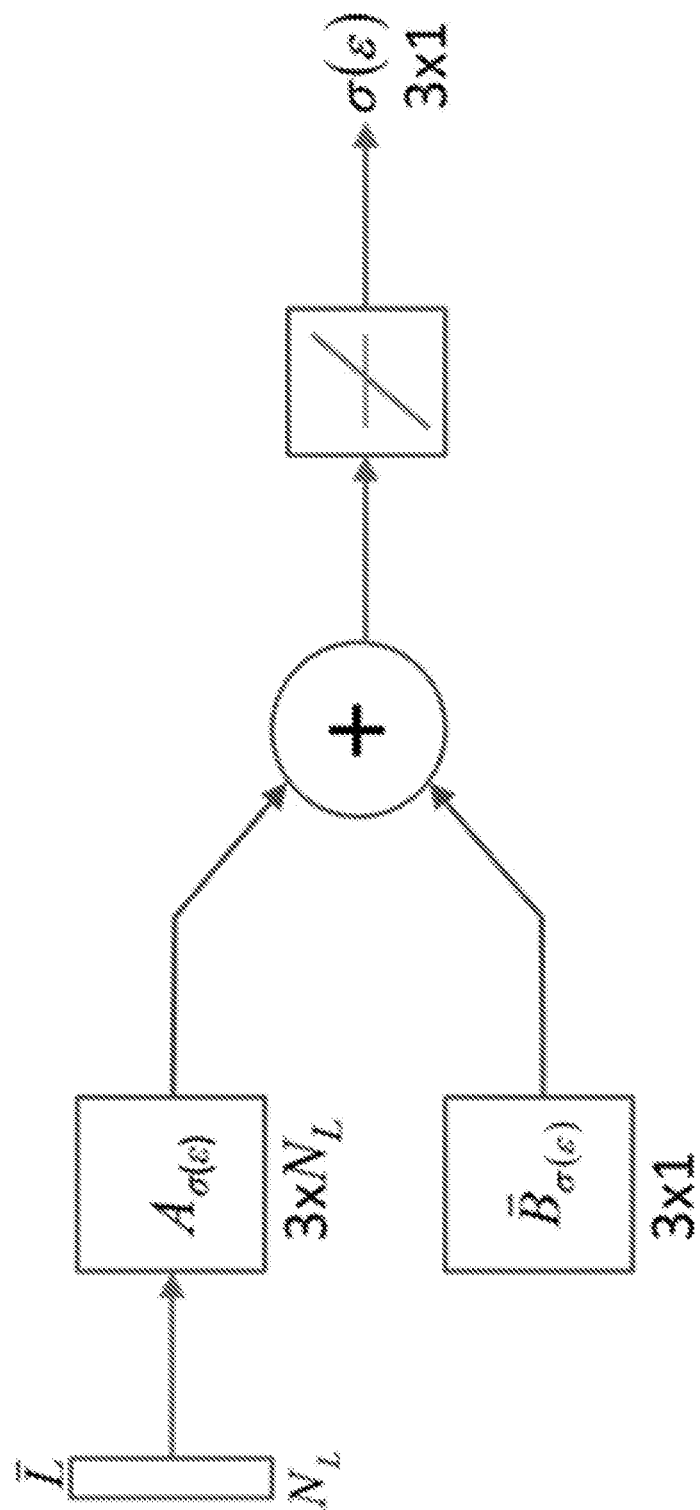
FIG. 5 is a diagram illustrating an adaptive linear element (ADALINE) neural network representation of the stress and strain, in accordance with various aspects of the subject technology.
Figure 6:
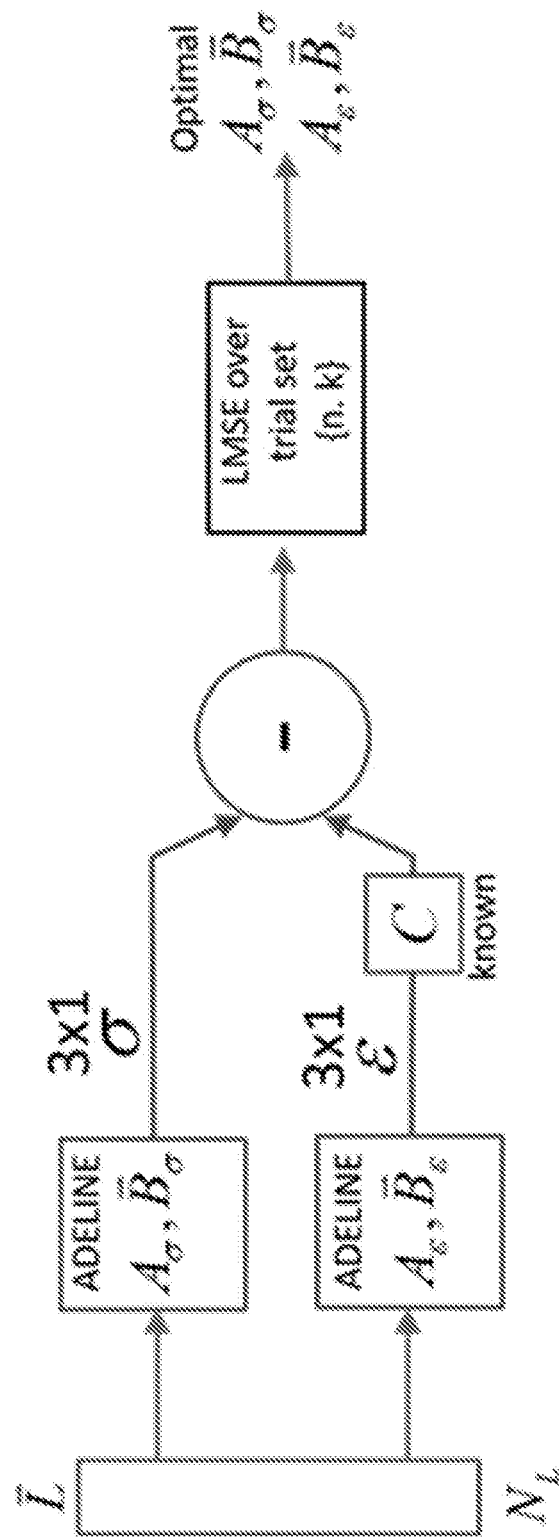
FIG. 6 is a diagram illustrating stress and strain networks train against each other using the stress-strain relationship for known stiffness matrix C, in accordance with various aspects of the subject technology.

FIG. 5 is a diagram illustrating an adaptive linear element (ADALINE) neural network representation of the stress and strain, in accordance with various aspects of the subject technology. In the diagram of FIG. 5, the output transfer function is the identity function. FIG. 6 is a diagram illustrating stress and strain networks training against each other using the stress-strain relationship for known stiffness matrix C, in accordance with various aspects of the subject technology. FIG. 6 helps illustrate how the calibration method can be interpreted as the stress and strain ADELINE networks training against each other through the stress strain relationship given known stiffness matrix C. The training set is indexed by depth bin {n, k}. The optimal network parameters, $A_\sigma$, $\vec{B}_\sigma$, $A_\varepsilon$, $\vec{B}_\varepsilon$ are determined by minimizing the L2 norm cost function (also known as the Least Mean Square Error (LMSE) algorithm) over the training set. It should be clear to those skilled in the art that the optimization can be made non-linear by adding hidden layers to the networks and using different minimization algorithms. It should also be understood that different transfer functions and cost functions may be employed without deviating from the spirit of the invention. Although FIGS. 5 and 6 illustrate the use of ADALINE neural networks, other types of neural networks and/or machine learning techniques may be used as well.

Estimating Pseudo-Stress-Strain Logs

As discussed above, the logs may map to the stresses and strains through the general linear mapping specified in equations (29) and (30). Thus we refer to the logs as pseudo-stress-strains and there may not be any constraints for the linear map per se. Various aspects of the subject technology optimize the linear map (including the best or improved constraints). One simple and constrained example is given by equation (40) where the equations assume the mapping is diagonal. However, the calibration equations may be derived without this constraint. Furthermore, some aspects of the subject technology are able to process the drilling data in different ways to produce multiple logs.

Aspects of the subject technology provide for the computing of the pseudo-stress, $L_{\sigma,nk}$ and pseudo-strain, $L_{\varepsilon,nk}$ of equation (40) from the axial acceleration, $G_z$. Alternative techniques involve estimating stress and strain from the axial acceleration. These techniques use the root mean square (RMS) value of the acceleration to give the stress up to an overall scale factor, $$RMS = \left\{\frac{1}{T}\int_0^T G_z^2(t)dt\right\}^{1/2}, \qquad (42)$$

These alternative techniques estimate strain from the axial displacement spectra Zero Frequency Level (ZFL). The strain calculation is a technique taken from much larger length scale seismic processing. The acceleration is Fourier transformed to the frequency domain and divided by the square of the angular frequency to convert to the displacement spectrum. Then the strain is interpreted as the displacement at the 'corner turn' frequency. The corner turn frequency is the low frequency point at which the higher frequency linear trend of the displacement spectrum on a log-log plot breaks.

However, these alternative techniques are associated with shortcomings with respect to computing stress and strain. For example, the acceleration does not equal the stress. The axial acceleration of the drill bit is proportional to the total axial force acting on the drill bit. This is roughly equal to the weight on bit minus the force of the rock (i.e. the rock stress) pushing back against the bit. Thus the changes in acceleration are roughly proportional to the stress as it loads and unloads during rock fracturing.

Various embodiments of the subject technology relate to estimating an axial pseudo-stress using the standard deviation of the acceleration. As an example, if the n'th depth bin has $N \cdot K_n$ total points, the pseudo-stress would be $$L_{\sigma,nk}=std\{G_{z,n}(Nk+1), \ldots, G_{z,n}((k+1)N)\} \\ \text{for } k=0, \ldots K_n-1. \qquad (43)$$

Accordingly, the pseudo-stress may also be computed as $$L_{\sigma,nk}=\text{mean}\{abs\{G_{z,n}(Nk+1)-\overline{G}_{z,nk}, \ldots, \\ G_{z,n}((k+1)N)-\overline{G}_{z,nk}\}\} \text{ for } k=0, \ldots K_n-1, \qquad (44)$$

where $$\overline{G}_{z,nk}=\text{mean}\{G_{z,n}(Nk+1), \ldots, G_{z,n}((k+1)N)\}. \qquad (45)$$

A further advantage of the subject technology over alternative techniques is that it is much less susceptible to bias errors in the estimation of $G_z$. Another drawback of alternative techniques is the lack of an obvious corner turn frequency in the displacement spectra. The data may be noisy by nature and the data points at low frequency are sparse on a log-log plot, so when one looks at a large number of spectra it becomes clear that a consistent, well defined corner turn often does not exist. Furthermore, computing the displacement spectrum requires taking a fairly large Fourier transform of the accelerometer data and dividing by the square of the angular frequency. This is mathematically equivalent to integrating the accelerometer data twice over the length of the Fast Fourier transform (FFT), but results in displacement errors due to accumulated accelerometer errors over the length of the FFT. These errors can be significant and not well correlated to the rock strain. The drift in the displacement should be removed before estimating the pseudo-strain.

Consequently, aspects of the subject technology include estimating an axial pseudo-strain associated with the axial pseudo-stress $$L_{\varepsilon,nk}=\text{mean}\{abs\{I_{z,n}(Nk+1)-(m_{nk}(0)+b_{nk}), \ldots, I_{z,n} \\ ((k+1)N)-(m_{nk}(N-1)+b_{nk})\}\} \text{ for } k=0, \ldots K_n-1, \qquad (46)$$

where $I_{z,n}$ is the numerical double integral of the axial acceleration, and $m_{nk}$ and $b_{nk}$ are the slope and intercept of the best fit line to $I_{z,nk}$. The length of the time segment, N, should be large enough to see the fluctuations in $I_{z,n}$ after removal of the drift, but not so large that drift errors cannot be removed with a linear fit. The higher frequency components left after linear drift removal may be better correlated to the pseudo-stress calculated from the accelerometer variations.

The calculations of pseudo-stress and pseudo-strain may be computed in the time domain, but equivalent equations may also be expressed in the frequency domain. Furthermore, these embodiments can also be applied to any 'acceleration', such as rotary acceleration of the drill bit. Once calculated, the pseudo-stress and pseudo-strain (and possibly other logs) are mapped to actual stress and strain using the calibrated linear map.

Figure 7:
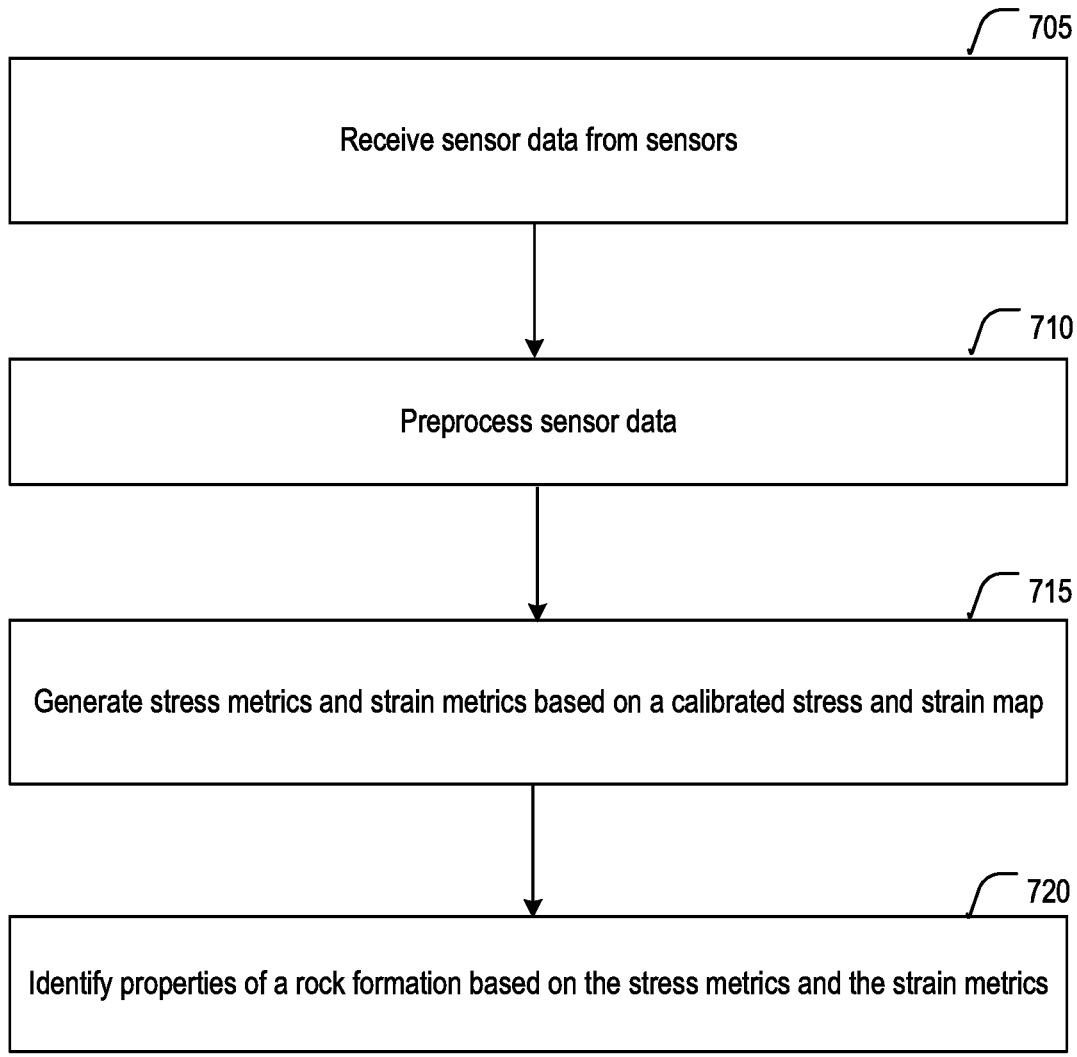
FIG. 7 is a diagram illustrating an example method of identifying properties of a rock formation based on stress and strain metrics, in accordance with various aspects of the subject technology.

FIG. 7 is a diagram illustrating an example process for identifying properties of a rock formation based on stress and strain metrics, in accordance with various aspects of the subject technology. The example process shown in FIG. 7 includes a number of operations in a particular configuration. However, other processes in accordance with various aspects of the subject technology may include additional operations, fewer operations, and/or alternative operations. Furthermore, the operations may be in different configurations or orders (e.g., some operations may be performed in parallel).

At operation 705, a system may be configured to receive sensor data obtained from one or more sensors. The sensor data may be generated from drilling operations performed in a wellbore at or near a rock formation. The sensors may include sensors positioned on components of a bottom-hole assembly and/or sensor or other sensor data generators positioned at a surface site. The sensors may be configured to collect sensor data including, for example, depth, time, acceleration, rate of penetration (ROP), weight on bit (WOB), torque on bit (TOB), magnetometer and gyroscope data, and the like. Other sensors generate acoustic data, density measurements, gamma ray measurements, and the like.

In some cases, the sensor data may need some additional preprocessing before stress and strain metrics may be generated based on the sensor data. At operation 710, one or more preprocessing actions may be taken on the sensor data. The preprocessing of operation 710 may include, for example, synchronizing sensor data from the one or more sensors. For example, the sensor data collected may consist of surface data, downhole data, other data from another source, or a combination. The different sources of data and/or measurements in the data may be time and/or depth tagged. The different sources and/or measurements of data may also be sampled at different rates. The system may be configured to synchronize the different data elements so that they may all be associated with a depth and/or time. The system is configured to collect and interpolate all the data variables from different sources to the same rate and correctly associated with depth/time tags. The preprocessing of operation 710 may also include parsing the sensor data into bins, wherein each bin is associated with an output set of elastic constants for a given output depth.

At operation 715, the system generates stress metrics and strain metrics for the sensor data based on a calibrated stress and strain map. The stress and strain map may represent a relationship between statistical properties of recorded data to acoustic properties of rocks in a formation.

The stress and strain map may be generated by collecting drilling data from various sources and relating the sensor data in the collected drilling data and other variables (e.g., drill bit type, rock formation characteristics, etc.) to the acoustic properties in the drilling data to build a library of prior calculations. The library may include data from offset wells, other remote wells, laboratory measurements in a controlled environment, or earlier recorded data from the same well.

The stress and strain map may be calibrated by using various regression techniques (e.g., multiple linear regressions) to estimate the parameters of a linear map and also optimizing the structure of the linear map. Non-linear maps and regressions may also be performed instead of or in combination with other regression techniques by adding hidden layers or polynomial inputs to the neural networks representing the stress and strain.

Once an optimal mapping is determined with regards to type of stress and/or strain excitation, number of drilling parameters used in the inversion, and number of estimated acoustic elastic constants, multiple linear regression is used to invert for the acoustic elastic constants as a function of depth. The multiple linear regression performed by the system is configured to model the relationship between two or more explanatory variables and a response variable by fitting a multiple linear equation to observed data. The resulting estimates are obtained cheaply in real-time or near real-time without the need of additional expensive sonic measurements.

At operation 720, the system may identify one or more properties of a rock formation based on the stress metrics and the strain metrics. In some embodiments, the stress metrics and strain metrics may include vector components of the stress and strain determined by applying the optimal linear map to the logs. The properties of the rock formation may include one or more elastics constants of the rock formation. The elastic constants of the rock formation may be calculated based on the mapping of logs to stress metrics and strain metrics and then using multiple linear regression on the stress and strain to estimate the elastic constants.

Figure 8:
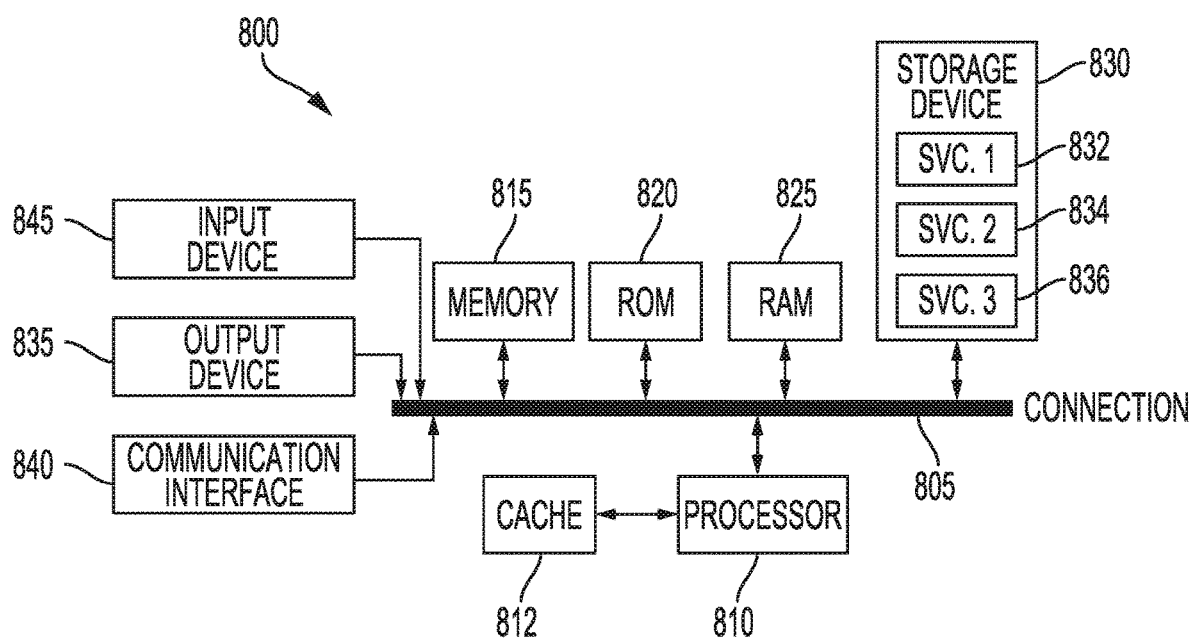
FIG. 8 is a diagram illustrating an example computing device architecture of a computing device which can implement the various technologies and techniques described herein, in accordance with various aspects of the subject technology.

FIG. 8, which illustrates an example computing device architecture 800 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 8 illustrates an example computing device architecture 800 of a computing device which can implement the various technologies and techniques described herein. For example, the computing device architecture 800 can implement the various training systems, detection systems, data processors, downhole tools, servers, or other computing devices and perform various steps, methods, and techniques disclosed herein. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device, etc. In some instances, multimodal computing devices can enable a user to provide multiple types of input to communicate with the computing device architecture 800. The communications interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include services 832, 834, 836 for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrated embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

The terms "proximal" and "distal" are used herein with reference to a user manipulating the tool. The term "proximal" referring to the portion closest to the user and furthest from the collar and the term "distal" referring to the portion located away from the user and closest to the collar. It will be further appreciated that, for convenience and clarity, spatial terms such as "vertical", "horizontal", "up", and "down" may be used herein with respect to the drawings. Notwithstanding, tools are used in many orientations and positions, and these terms are not intended to be limiting and/or absolute.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method of comprising receiving sensor data obtained from one or more sensors, the sensor data generated from drilling operations performed in a wellbore; generating stress metrics and strain metrics for the sensor data based on a calibrated stress and strain map; and identifying one or more properties of a rock formation based on the stress metrics and the strain metrics.

Statement 2. The method of Statement 1, wherein the one or more properties comprises one or more elastics constants of the rock formation.

Statement 3. The method of Statements 1 through 2, further comprising calculating the calibrated stress and strain map using multiple linear regression on drilling and sensor data logs with known elastic constants.

Statement 4. The method of Statements 1 through 2, further comprising calculating unknown elastic constants using multiple linear regression on the stress metrics and strain metrics derived from applying the calibrated stress and strain map to drilling and sensor data logs.

Statement 5. The method of Statements 1 through 4, further comprising preprocessing the sensor data, wherein the preprocessing of the sensor data comprises synchronizing sensor data from the one or more sensors.

Statement 6. The method of Statements 1 through 5, further comprising parsing the sensor data into a plurality of bins, wherein each bin is associated with an output set of elastic constants for a given output depth.

Statement 7. The method of Statements 1 through 6, further comprising generating the calibrated stress and strain map.

Statement 8. The method of Statements 1 through 7, further comprising calibrating the calibrated stress and strain map using multiple linear regression with known elastic constants.

Statement 9. The method of Statements 1 through 8, further comprising calibrating the stress and strain map using hidden layers, polynomial inputs, or other neural network optimization techniques in the neural networks representing stress and strain.

Statement 10. The method of Statements 1 through 9, wherein the one or more sensors include at least one sensor positioned on a component of a bottom-hole assembly and/or at least one sensor positioned at a surface site.

Statement 11. The method of Statements 1 through 10, wherein the sensor data comprises (but is not limited to) at least one of depth, time, axial acceleration, angular acceleration, rate of penetration (ROP), weight on bit (WOB), or torque on bit (TOB).

Statement 12. A system comprising one or more processors and at least one non-transitory computer-readable medium having stored therein instructions which, when executed by the one or more processors, cause the system to receive sensor data obtained from one or more sensors, the sensor data generated from drilling operations performed in a wellbore; generate stress metrics and strain metrics for the sensor data based on a stress and strain map; and identify one or more properties of a rock formation based on the stress metrics and the strain metrics.

Statement 13. The system of Statement 12, wherein the one or more properties comprises one or more elastics constants of the rock formation.

Statement 14. The system of Statements 12 through 13, wherein the instructions further cause the system to calculate the one or more elastic constants of the rock formation based on a linear regression of stress metrics and strain metrics derived from applying the calibrated map to the drilling and sensor data logs.

Statement 15. The system of Statements 12 through 14, wherein the instructions further cause the system to synchronize sensor data from the one or more sensors.

Statement 16. Statements 12 through 15, wherein the instructions further cause the system to comprise generating the stress and strain map based on drilling data obtained in prior drilling operations.

Statement 17. The system of Statements 12 through 16, wherein the prior drilling operations are from at least one of an offset well, a remote well, or laboratory measurements.

Statement 18. The system of Statements 12 through 17, wherein the prior drilling operations are from the wellbore.

Statement 19. A non-transitory computer-readable medium comprising instructions that, when executed by one or more processors, cause a computing device to receive sensor data obtained from one or more sensors, the sensor data generated from drilling operations performed in a wellbore and identify one or more properties of a rock formation based on a stress and strain map.

Statement 20. The non-transitory computer-readable medium of Statement 19, wherein the instructions further cause the computing device to generate stress metrics and strain metrics for the sensor data based on the stress and strain map, wherein the one or more properties of the rock formation are based on the stress metrics and the strain metrics.

Statement 21. The non-transitory computer-readable medium of Statements 19 through 20, wherein the one or more sensors include at least one sensor positioned on a component of a bottom-hole assembly and/or at least one sensor positioned at a surface site.

Statement 22: A system comprising means for performing a method according to any of Statements 1 through 21.

What is claimed is:

1. A system comprising:
   one or more processors; and
   at least one non-transitory computer-readable medium having stored therein instructions which, when executed by the one or more processors, cause the system to:
      receive sensor data obtained from one or more sensors, the sensor data generated from drilling operations performed in a wellbore;
      parsing the sensor data into a plurality of depth bins, wherein each bin is associated with an output set of elastic constants for a given output depth;
      generate stress metrics and strain metrics for the sensor data based on a stress and strain map; and
      identify one or more properties of a rock formation based on the stress metrics and the strain metrics, wherein the one or more properties comprises one or more elastic constants of the rock formation, and wherein the one or more elastic constants are calculated using multiple linear regression on the stress metrics and strain metrics and minimizing an L2 norm square difference for a depth bin.

2. The system of claim 1, wherein the instructions further cause the system to synchronize sensor data from the one or more sensors.

3. The system of claim 1, wherein the instructions further cause the system to generate the stress and strain map based on drilling data obtained in prior drilling operations.

4. The system of claim 3, wherein the prior drilling operations are from at least one of an offset well, a remote well, or laboratory measurements.

5. The system of claim 3, wherein the prior drilling operations are from the wellbore.

* * * * *